United States Patent
Arai

(10) Patent No.: US 11,393,613 B2
(45) Date of Patent: Jul. 19, 2022

(54) COIL DEVICE, AND MOTOR-DRIVEN VALVE AND SOLENOID VALVE INCLUDING SUCH A COIL DEVICE

(71) Applicant: Fujikoki Corporation, Tokyo (JP)

(72) Inventor: Yusuke Arai, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 558 days.

(21) Appl. No.: 16/484,689

(22) PCT Filed: Dec. 5, 2017

(86) PCT No.: PCT/JP2017/043612
§ 371 (c)(1),
(2) Date: Aug. 8, 2019

(87) PCT Pub. No.: WO2018/173378
PCT Pub. Date: Sep. 27, 2018

(65) Prior Publication Data
US 2020/0043640 A1    Feb. 6, 2020

(30) Foreign Application Priority Data

Mar. 21, 2017 (JP) .............................. JP2017-054362

(51) Int. Cl.
*H01F 5/04* (2006.01)
*F16K 31/06* (2006.01)
*H02K 1/14* (2006.01)

(52) U.S. Cl.
CPC ........... *H01F 5/04* (2013.01); *F16K 31/0606* (2013.01); *H02K 1/146* (2013.01); *H01F 2005/043* (2013.01); *H02K 2203/12* (2013.01)

(58) Field of Classification Search
CPC ................. H01F 5/04; H01F 2005/043; H01F 2007/062; H01R 4/023; H01R 4/027; H01R 4/10
See application file for complete search history.

(56) References Cited

U.S. PATENT DOCUMENTS

| | | |
|---|---|---|
| 2010/0245010 A1 | 9/2010 | Sugiyama et al. |
| 2015/0302963 A1 | 10/2015 | Arai et al. |
| 2016/0155591 A1 | 6/2016 | Miura et al. |

FOREIGN PATENT DOCUMENTS

| | | |
|---|---|---|
| CN | 202632925 U | 12/2012 |
| JP | 08-065994 A | 3/1996 |
| JP | 11-186023 A | 7/1999 |
| JP | 3868200 B2 | 1/2007 |

(Continued)

OTHER PUBLICATIONS

Office Action for Corresponding Korean Patent Application No. 10-2019-7022124, dated Jun. 5, 2020, pp. 1-5, English translation 4 pages.

(Continued)

*Primary Examiner* — Ramon M Barrera
(74) *Attorney, Agent, or Firm* — Lucas & Mercanti, LLP

(57) ABSTRACT

Provided are a coil device that considerably reduces the man-hours and the cost for manufacturing, and a motor-driven valve and a solenoid valve including such a coil device. The terminal end of the magnet wire is fixed to a conducting terminal by swaging and/or fusing at a distal-end binding part for binding the terminal end of the magnet wire.

5 Claims, 9 Drawing Sheets

(56) References Cited

FOREIGN PATENT DOCUMENTS

| | | |
|---|---|---|
| JP | 2015-204433 A | 11/2015 |
| JP | 2016-103606 A | 6/2016 |

OTHER PUBLICATIONS

Office Action for Corresponding Chinese Application No. 201780087340.4, dated Sep. 29, 2020, 9 pages, English translation 10 pages.
European Patent Office, "Extended European Search Report" issued in connection with corresponding European patent application No. 17902049.0, dated Nov. 25, 2020 (9 pages).

U-U Cross-section

COIL DEVICE, AND MOTOR-DRIVEN VALVE AND SOLENOID VALVE INCLUDING SUCH A COIL DEVICE

CROSS-REFERENCE TO RELATED APPLICATIONS

This application is a 371 of PCT/JP2017/043612, filed Dec. 5, 2017, which claims benefit of Japanese Patent Application No. 2017-054362 filed on Mar. 21, 2017.

TECHNICAL FIELD

The present invention relates to coil devices, and motor-driven valves and solenoid valves including such a coil device.

BACKGROUND ART

Conventionally motor-driven flow control valves have been known to control the flow rate of fluid, such as refrigerant. Such a motor-driven flow control valve includes a valve body having a first port and a second port communicating with a valve chamber and having a valve seat at a communicating valve orifice of the partition wall of the second port, a valve shaft having a needle valve at the leading end to come in contact with the valve seat of the valve body, and a stepping motor to move the valve shaft in the axial direction for opening and closing operation of the needle valve.

A stepping motor for such a conventional motor-driven flow control valve includes a stator coil (coil device). This stator coil includes: first and second outer yokes having a plurality of magnetic-pole teeth protruding on the inner periphery; first and second coil-wound bobbins (coil bobbin with a coil made of magnet wire wound therearound) being positioned and fitted into these outer yokes; first and second inner yokes having the same number of magnetic-pole teeth as those of the first and second outer yokes that protrude on the inner periphery, the first and second inner yokes being positioned and fitted into the openings of the first and second outer yokes; a gap-keeping means to keep a gap to pour mold resin between the first inner yoke and the second inner yoke; and an outer shell that is a molded resin so as to fill the gap, gaps between the magnetic-pole teeth and a space in the wire on the bobbins for molding and to cover the outside of the outer yokes. This stator coil has a connector as a tubular socket that is integrally formed on the outer periphery of the outer shell and protrudes from the outer shell (see Patent Literatures 1 and 2, for example).

Recently proposed coil devices of this type include highly heat-resistant magnet wire to be wound on a coil bobbin for better heat resistance. Since a highly heat-resistant material, such as polyimide, is used to cover such highly heat-resistant magnet wire, soldering is not suitable to connect the wire with a conducting terminal.

The typical manufacturing process for a coil device including such highly heat-resistant magnet wire therefore employs fusing by resistant welding to connect the highly heat-resistant magnet wire with the conducting terminal. This fusing catches a part of the magnet wire with a protrusion on the conducting terminal, for example, and melts the covering of the magnet wire with heat generated from resistant welding to connect the magnet wire with the conducting terminal. To catch the magnet wire with the protrusion firmly, the fusing is required to keep the magnet wire in position on both sides of the protrusion. To this end, "binding" is typically performed so as to wind the magnet wire around the conducting terminal on both sides of the protrusion (see Patent Literature 3, for example).

CITATION LIST

Patent Literatures

Patent Literature 1: JP H08-65994
Patent Literature 2: JP 2015-204433
Patent Literature 3: JP 3868200

SUMMARY OF INVENTION

Technical Problem

Such a part for binding of the magnet wire is not necessary after fusing (i.e., after connection of the magnet wire with the conducting terminal). Among these binding parts, a binding part to wind the terminal end of the magnet wire especially has to be removed after fusing so as to avoid short-circuit resulting from getting loose of the "binding" due to resin flowing during resin molding or pressure applied during the molding. Such removal of the binding part is not suitable for automation with an automated coil winding machine that automatically winds magnet wire around a coil bobbin, and causes a considerable increase in the man-hours and the cost for manufacturing.

In view of the above problems, the present invention aims to provide a coil device that considerably reduces the man-hours and the cost for manufacturing, and a motor-driven valve and a solenoid valve including such a coil device.

Solution to Problem

To solve the above-stated problems, a coil device according to the present invention includes: a coil bobbin having a wind-starting side conducting terminal and a wind-ending side conducting terminal; magnet wire wound around the coil bobbin and having a starting end bound and fixed to the wind-starting side conducting terminal and a terminal end bound and fixed to the wind-ending side conducting terminal; and a mold resin covering an outer periphery of the magnet wire. The wind-ending side conducting terminal includes, from the proximal-end, a wind-ending side proximal-end binding part and a wind-ending side distal-end binding part for binding the magnet wire, and a wind-ending side wire-connecting part between the wind-ending side proximal-end binding part and the wind-ending side distal-end binding part for connecting the magnet wire with the wind-ending side conducting terminal. The terminal end of the magnet wire is fixed to the wind-ending side conducting terminal by swaging and/or fusing at the wind-ending side distal-end binding part.

In a preferable embodiment, the wind-ending side distal-end binding part has: a relatively narrow winding part that protrudes from the wind-ending side conducting terminal and being for binding the magnet wire; and a relatively wide contacting part that protrudes from the winding part and being brought into contact with the wind-ending side conducting terminal.

In a preferable embodiment, the winding part of the wind-ending side distal-end binding part and the wind-ending side wire-connecting part have a same width.

In another preferable embodiment, the wind-ending side conducting terminal has a rectangular shape in cross section, and the wind-ending side distal-end binding part and the wind-ending side wire-connecting part face a same face of the wind-ending side conducting terminal.

The wind-starting side conducting terminal includes, from the distal end, a wind-starting side distal-end binding part and a wind-starting side proximal-end binding part for binding the magnet wire, and a wind-starting side wire-connecting part between the wind-starting side distal-end binding part and the wind-starting side proximal-end binding part for connecting the magnet wire with the wind-starting side conducting terminal.

A motor-driven valve according to the present invention includes: a stepping motor having the coil device as stated above; a valve body having a valve orifice, and a valve shaft that is driven by a driving force from the energized stepping motor to open and close the valve orifice.

A solenoid valve according to the present invention includes: the coil device as stated above; a valve body having a valve orifice, and a valve shaft that is driven by a magnetic force from the energized coil device to open and close the valve orifice.

Advantageous Effects of Invention

According to the present invention, the terminal end of the magnet wire wound around the coil bobbin is fixed to the wind-ending side conducting terminal by swaging and/or fusing at the wind-ending side distal-end binding part to bind the terminal end of the magnet wire. This considerably reduces the man-hours and the cost for manufacturing because it firmly fixes the terminal end of the magnet wire to the wind-ending side conducting terminal with the wind-ending side distal-end binding part, and eliminates the job to remove the wind-ending side distal-end binding part.

The wind-ending side distal-end binding part and the wind-ending side wire-connecting part of the wind-ending side conducting terminal face the same face of the wind-ending side conducting terminal. This facilitates the job to connect the magnet wire with the wind-ending side conducting terminal and the job to fix the magnet wire to the wind-ending side conducting terminal, and so simplifies the manufacturing process.

DESCRIPTION OF EMBODIMENTS

The following describes one embodiment of the present invention with reference to the drawings.

Figure 1A:
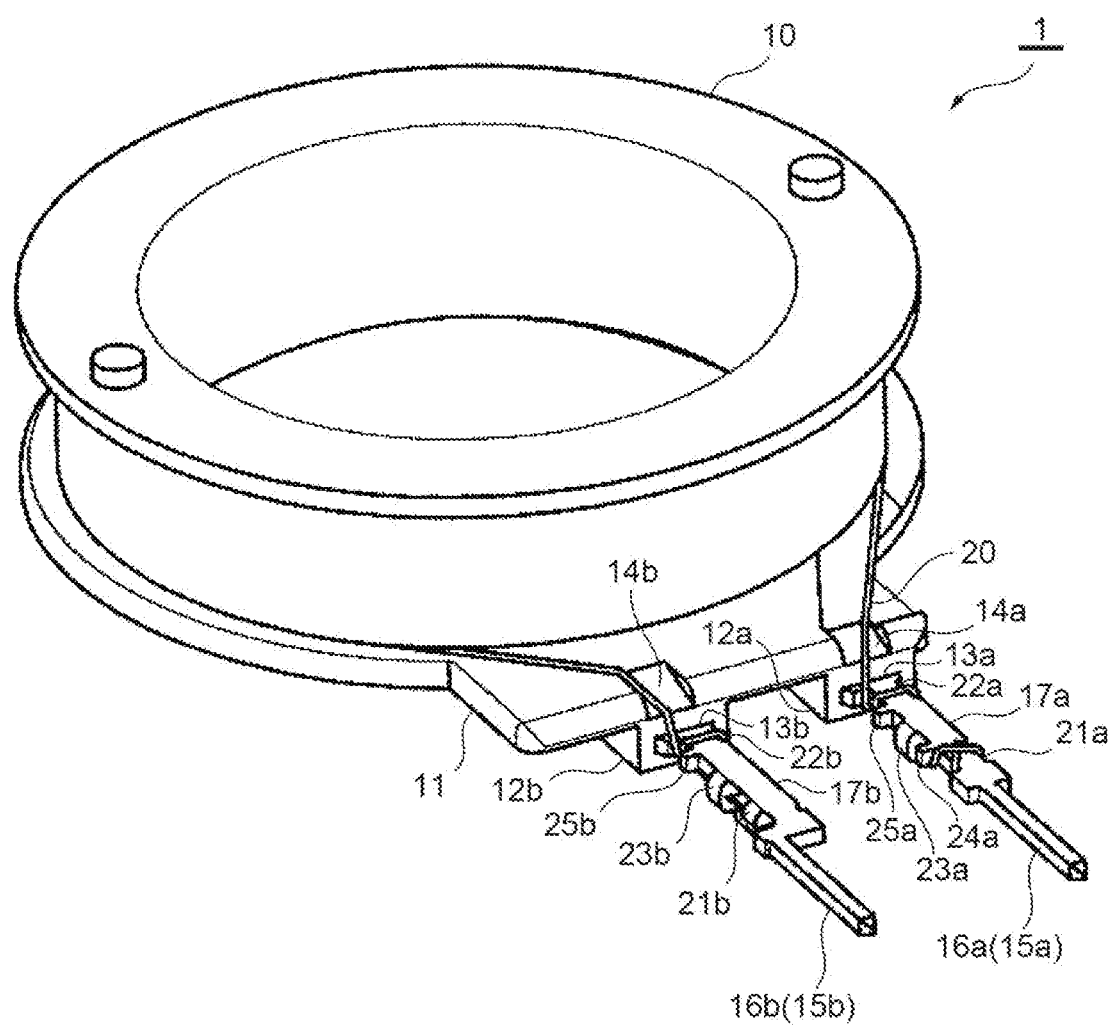
FIG. 1A is a perspective view of a major part of a coil device that is one embodiment of the present invention viewed from the above.
Figure 1B:
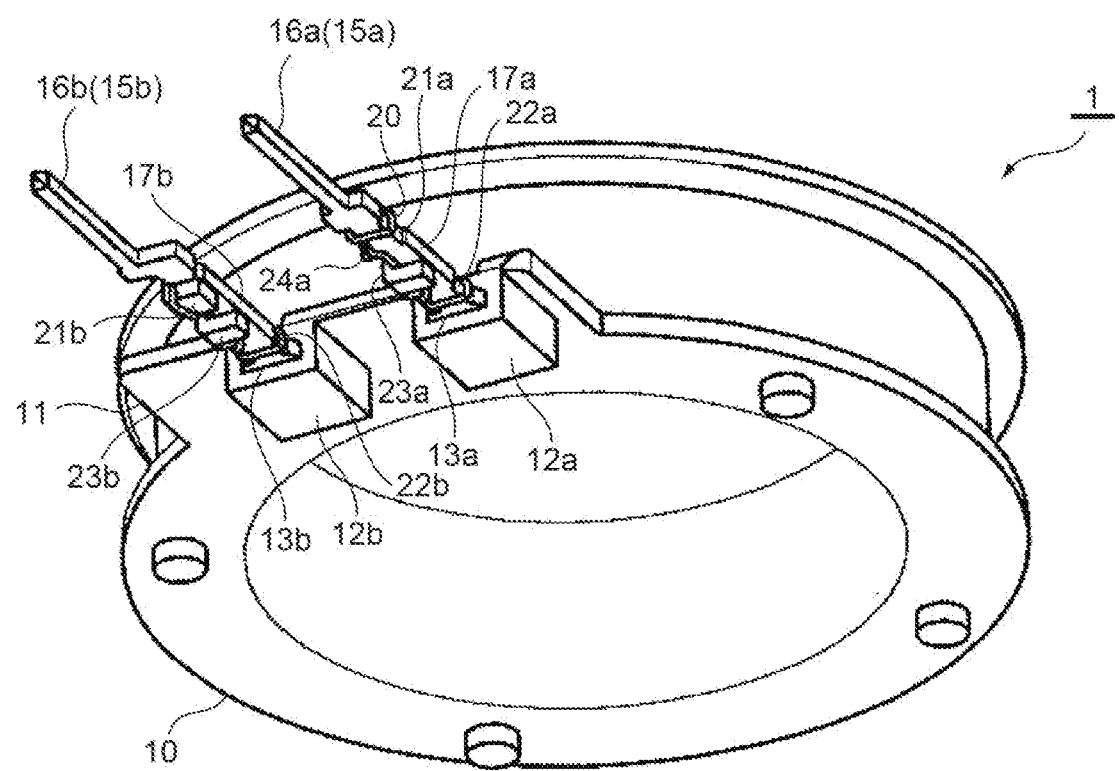
FIG. 1B is a perspective view of a major part of a coil device that is one embodiment of the present invention viewed from the below.
Figure 2:
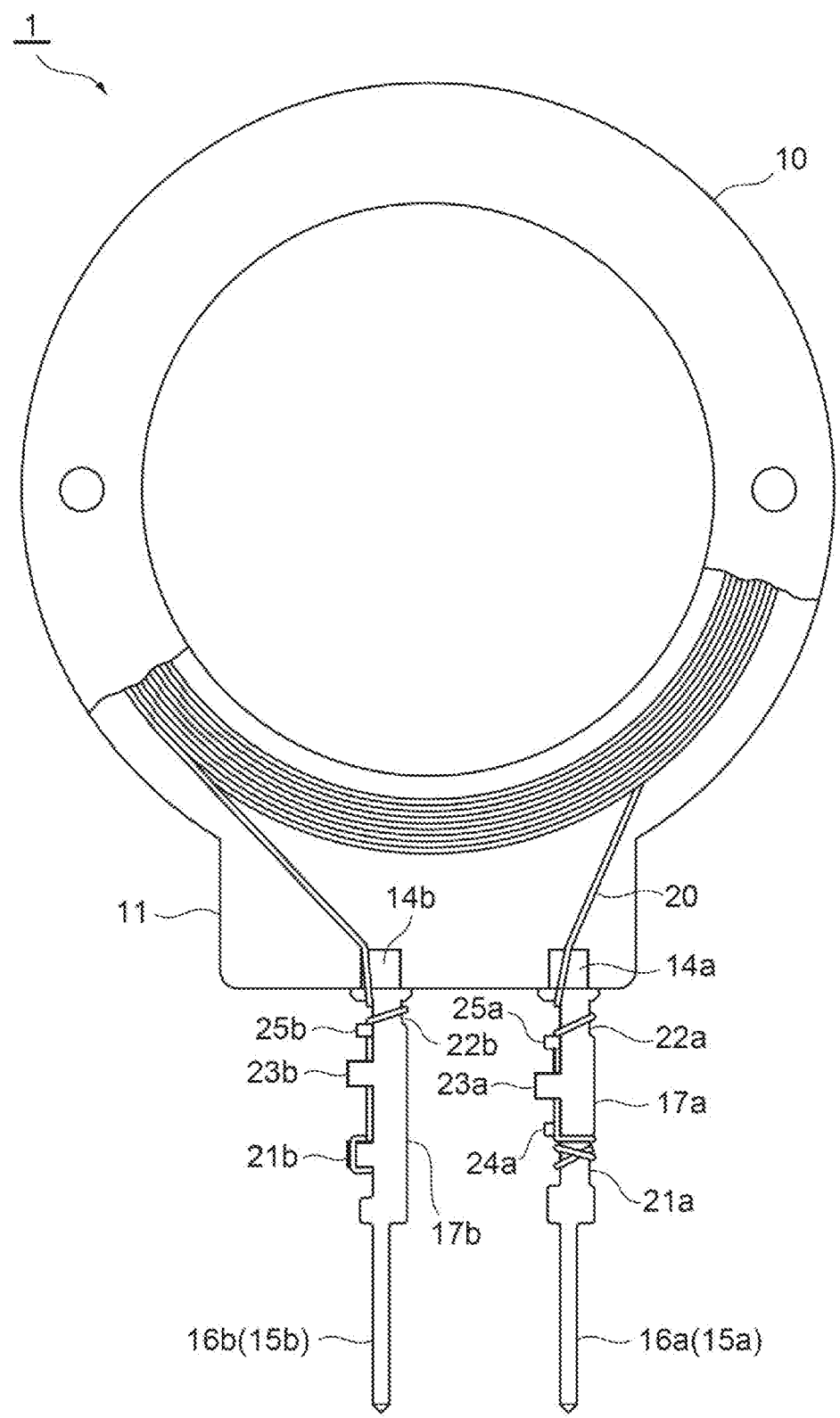
FIG. 2 is a partially cutaway top view of the coil device shown in FIGS. 1A and 1B.
Figure 3:
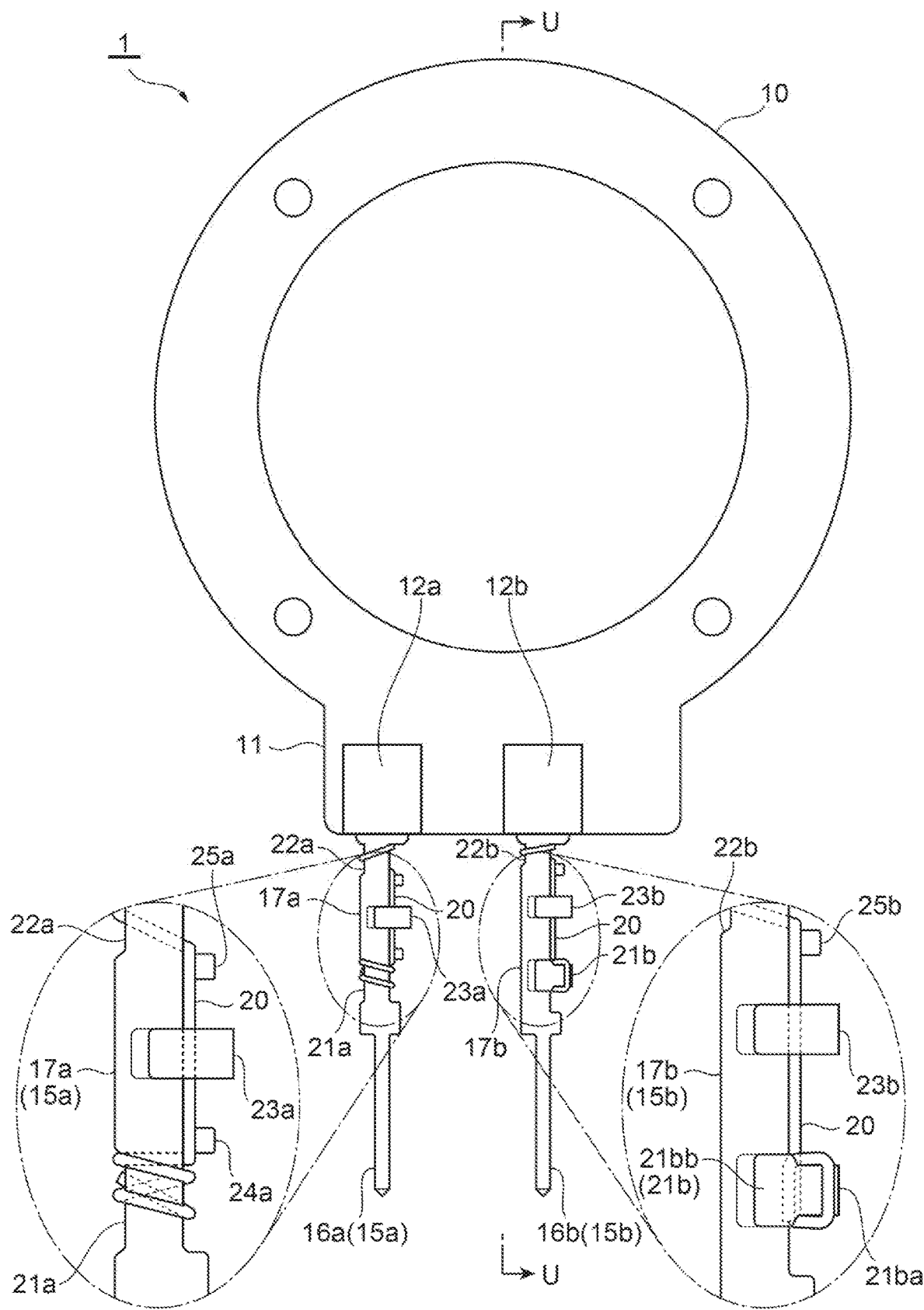
FIG. 3 is a bottom view of the coil device shown in FIGS. 1A and 1B having enlarged views of the major parts.
Figure 4:
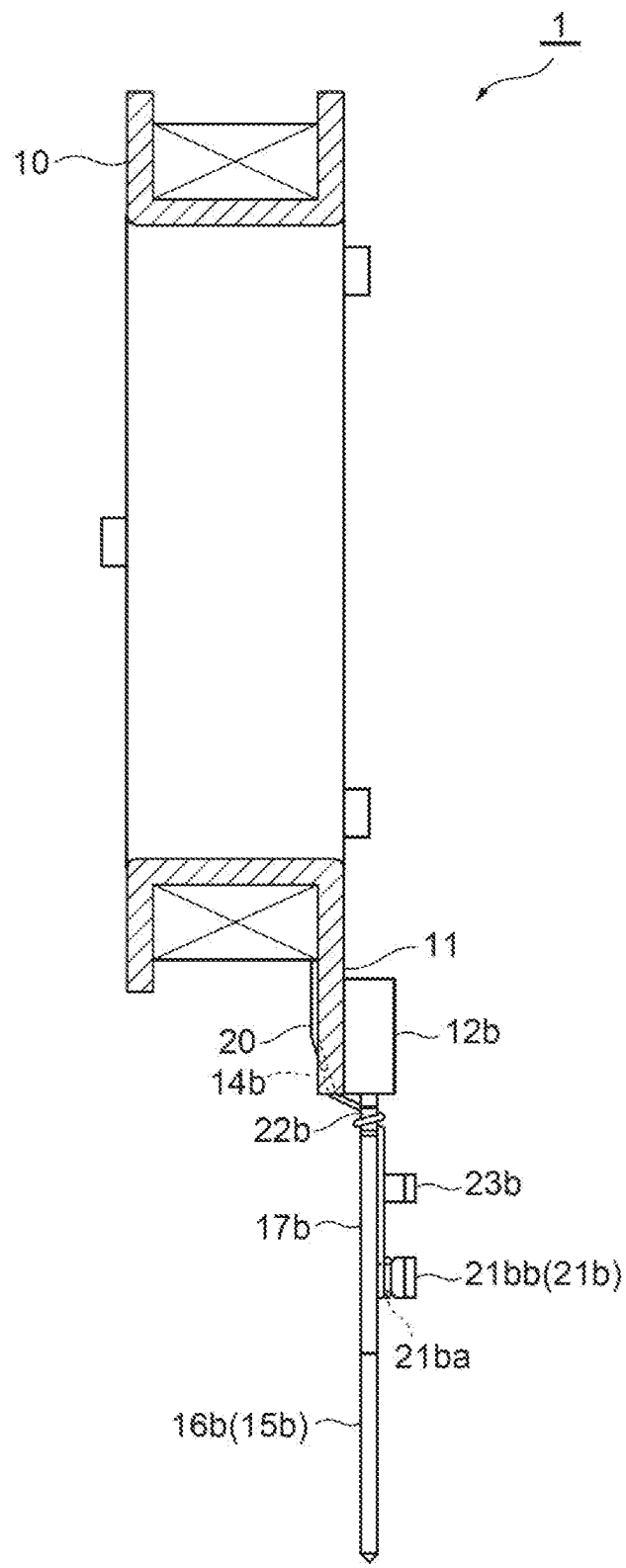
FIG. 4 is a cross-sectional view taken along the arrows U-U of FIG. 3.

FIGS. 1A and 1B are perspective views of a major part of a coil device that is one embodiment of the present invention. FIG. 1A is a perspective view from the above and FIG. 1B is a perspective view from the below. FIG. 2 is a partially cutaway top view of the coil device shown in FIGS. 1A and 1B. FIG. 3 is a bottom view of the coil device shown in FIGS. 1A and 1B having enlarged views of the major parts. FIG. 4 is a cross-sectional view taken along the arrows U-U of FIG. 3.

The following descriptions refer to positional and directional terms, such as up and down, left and right, and front and rear, for easy understanding of the descriptions with the drawings, and these terms do not always show the positions and directions of the coil device in use.

The coil device 1 of the present embodiment shown in the drawings includes, as major parts, a coil bobbin 10 made of resin, for example, having conducting terminals 15a and 15b (wind-starting side conducting terminal 15a and wind-ending side conducting terminal 15b), and magnet wire 20 wound around the coil bobbin 10.

The coil bobbin 10 has a terminal connecting part 11 on the outer periphery at the bottom end that has a substantially rectangular shape in plan view. The terminal connecting part 11 has a bottom face that is integral with supports 12a and 12b that protrude from the bottom face. These supports 12a and 12b have insertion holes 13a and 13b for press fitting and fixing of the conducting terminals 15a and 15b, respectively. The drawings show an example where two rectangular supports 12a and 12b are arranged laterally along the outer edge of the terminal connecting part 11, and each support 12a, 12b has the insertion hole 13a, 13b at a substantially center, the insertion hole 13a, 13b being a rectangle in cross section.

The terminal connecting part 11 has a guide 14a and a guide 14b that are arranged laterally at the outer edge of the upper face (specifically above the supports 12a and 12b on the bottom face). The guide 14a is an inclined face for a part of the magnet wire 20 that is wound (bound) around the conducting terminal 15a (proximal-end binding part 22a thereof) that the support 12a supports for fixing, and keeps the part in position relative to the coil bobbin 10 and guides the part. The guide 14b is an inclined face for a part of the magnet wire 20 that is wound around the coil bobbin 10, and keeps the part in position relative to the conducting terminal 15b (proximal-end binding part 22b thereof) that the support 12b supports for fixing and guides the part.

The insertion holes 13a and 13b of the terminal connecting part 11 (the supports 12a and 12b thereof) receive the press-fitted conducting terminals 15a and 15b (the proximal ends thereof), respectively, to support and fix them. The conducting terminals 15a and 15b are made of wire or plates having a rectangular shape in cross section, for example.

Each conducting terminal 15a, 15b has a terminal part 16a, 16b near the distal end, and a conducting part 17a, 17b near the proximal end. The terminal part 16a, 16b is a part protruding from mold resin 5 (see FIGS. 6 and 7) described later, and has a substantially square shape in cross section. The conducting part 17a, 17b is a part to be molded with the mold resin 5, and has a flattened shape that is slightly horizontally longer (i.e., having a substantially rectangular shape in cross section). The conducting part 17a, 17b of the conducting terminal 15a, 15b has a fusing part 23a, 23b that is a wire-connecting part to which the magnet wire 20 is fixed for electrical connection (wire connection). The conducting part 17a, 17b also has distal-end binding part 21a, 21b close to the distal end and proximal-end binding part 22a, 22b close to the proximal end on both sides of the fusing part 23a, 23b to bind the magnet wire 20.

More specifically the conducting terminal (wind-starting side conducting terminal) 15a has the distal-end binding part (wind-starting side distal-end binding part) 21a close to the distal end of the conducting part 17a and the proximal-end binding part (wind-starting side proximal-end binding part) 22a close to the proximal end (close to the base) of the conducting part 17a, and the distal-end binding part 21a and the proximal-end binding part 22a are narrow parts that are slightly recessed along a lateral part on one side. The conducting terminal 15a also has a fusing part (wind-starting side wire-connecting part) 23a at a substantially middle part between the distal-end binding part 21a and the proximal-end binding part 22a. The fusing part 23a is a hook-like protrusion having a substantially rectangular shape and protrudes horizontally from the other side of the conducting terminal 15a (the lateral part on the other side of the above-stated one side) and is bent in the opposite direction so that the leading end of the fusing part faces the lower face of the conducting terminal 15a (i.e., formed by bending at about 180°).

The conducting terminal 15a (at a part along the other side) has a positioning projection 24a that protrudes between the distal-end binding part 21a and the fusing part 23a (in the illustrated example, near the distal-end binding part 21a) and a positioning projection 25a that protrudes between the fusing part 23a and the proximal-end binding part 22a (in the illustrated example, near the proximal-end binding part 22a). These positioning projections 24a and 25a are for positioning of the magnet wire 20 at the fusing part 23a.

Meanwhile, the conducting terminal (wind-ending side conducting terminal) 15b has a proximal-end binding part (wind-ending side proximal-end binding part) 22b at a part close to the proximal end (close to the base) of the conducting part 17b, and this proximal-end binding part 22b is a narrow part similar to the proximal-end binding part 22a of the conducting terminal (wind-starting side conducting terminal) 15a other than that the proximal-end binding part 22b is slightly shorter than the proximal-end binding part 22a in the longitudinal direction. The conducting terminal 15b also has a distal-end binding part (wind-ending side distal-end binding part) 21b at a part close to the distal end of the conducting part 17b. This distal-end binding part 21b is a hook-like stepped protrusion having a substantially rectangular shape and protrudes horizontally from the lateral part of the conducting terminal 15b and is bent in the opposite direction so that the leading end of the distal-end binding part faces the lower face of the conducting terminal 15b (i.e., formed by bending at about 180°). The conducting terminal 15b also has a fusing part (wind-ending side wire-connecting part) 23b at a substantially middle part between the proximal-end binding part 22b and the distal-end binding part 21b, and this fusing part 23b has a substantially same shape as the fusing part 23a of the conducting terminal (wind-starting side conducting terminal) 15a.

The distal-end binding part 21b of the conducting terminal 15b in this example has a stepped structure including: a winding part 21ba that is relatively narrow and protrudes from the conducting terminal 15b; and a contacting part 21bb that is relatively wide and protrudes from the winding part 21ba. The width of the winding part 21ba (in the longitudinal direction of the conducting terminal 15b) is substantially the same as the width of the fusing part 23b of the conducting terminal 15b and the fusing part 23a of the conducting terminal 15a (in the longitudinal direction of the conducting terminal 15b and the conducting terminal 15a) (particularly see FIG. 3).

The conducting terminal 15b (at the lateral part) has a positioning projection 25b between the proximal-end binding part 22b and the fusing part 23b (in the illustrated example, near the proximal-end binding part 22b). This positioning projection 25b is for positioning of the magnet wire 20 at the fusing part 23b.

The magnet wire 20 at a part close to the starting end is bound for several rounds at the distal-end binding part 21a of the conducting terminal 15a while applying a predetermined tensile force, and then is kept in position by the positioning projection 24a and passes through the fusing part 23a (more specifically through a gap between the conducting terminal 15a and the hook-like fusing part 23a before fusing). The magnet wire 20 is then bound to the proximal-end binding part 22a close to the base via the positioning projection 25a, and is extended along the guide (inclined face) 14a (i.e., is guided along the guide 14a) of the terminal connecting part 11 to be wound around the coil bobbin 10. After winding around the coil bobbin 10, a part of the magnet wire 20 close to the terminal end is bound to the proximal-end binding part 22b close to the base of the conducting terminal 15b via the guide (inclined face) 14b (i.e., guided along the guide 14b) of the terminal connecting part 11. The magnet wire 20 then is kept in position by the positioning projection 25b and passes through the fusing part 23b (more specifically through between the conducting terminal 15b and the hook-like fusing part 23b before fusing), and is bound for several rounds at the winding part 21ba of the distal-end binding part 21b. After that, the starting end and the terminal end of the magnet wire 20 are cut at predetermined positions with the corners of the conducting terminals 15a and 15b. The magnet wire 20 (the parts close to the starting end and the terminal end thereof) is then fixed to the conducting terminals 15a and 15b by fusing at the fusing parts 23a and 23b (on the lower face) of the conducting terminals 15a and 15b (specifically while catching the magnet wire 20 with the fusing parts 23a and 23b protruding from the conducting terminals 15a and 15b) for electrical connection (continuity).

After such fusing at the fusing parts 23a and 23b of the present embodiment, the relatively wide contacting part 21bb of the distal-end binding part 21b is brought into contact with the conducting terminal 15b while applying pressure (comes in contact while pressing against to the conducting terminal), and the distal-end binding part 21b is then swaged or fused or swaged and fused (from the lower face), so that the terminal end of the magnet wire 20 (the part bound to the distal-end binding part 21b of the conducting terminal 15b) is fixed (bonded) to the conducting terminal 15b.

Such fixing of the terminal end of the magnet wire 20 to the conducting terminal 15b may be performed before fusing at the fusing parts 23a and 23b, and may be performed concurrently with the fusing at the fusing parts 23a and 23b.

Figure 6:
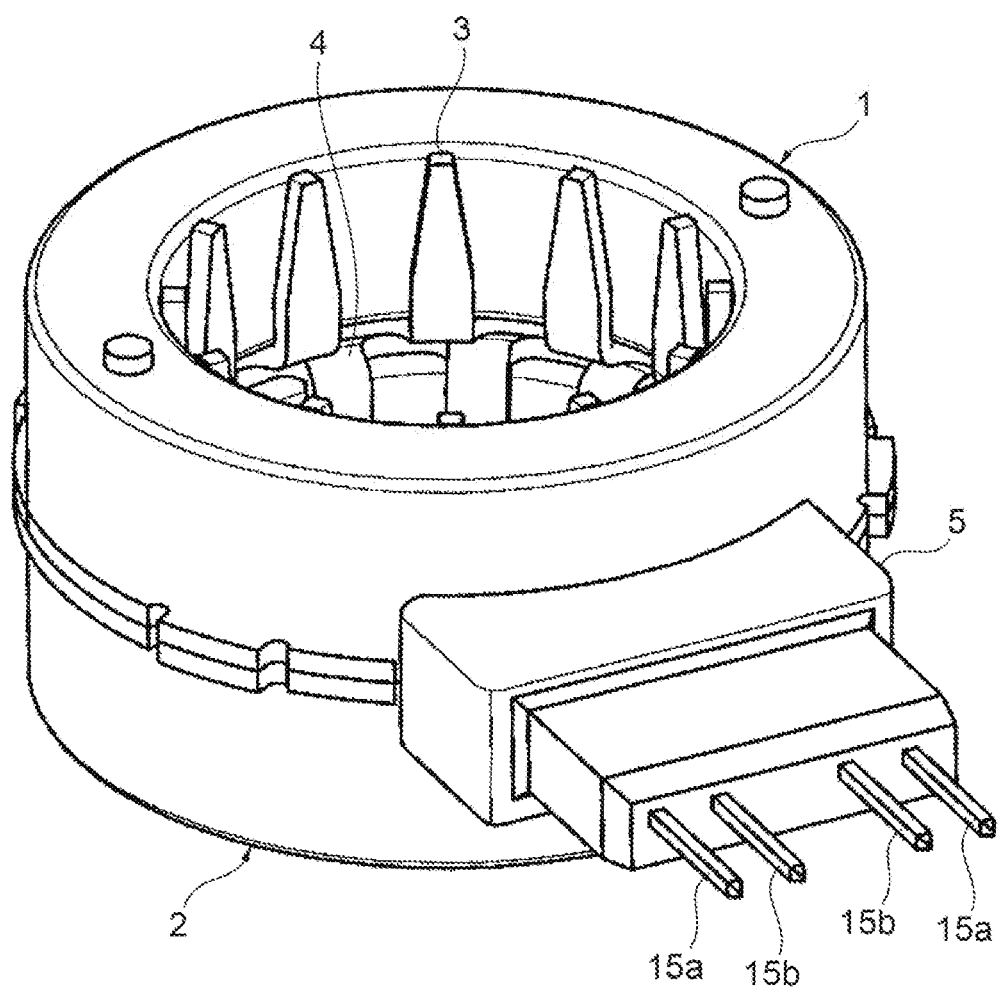
FIG. 6 is a perspective view showing the assembly step (state 2 during assembly) of the stator coil including the coil device shown in FIGS. 1A and 1B.
Figure 7:
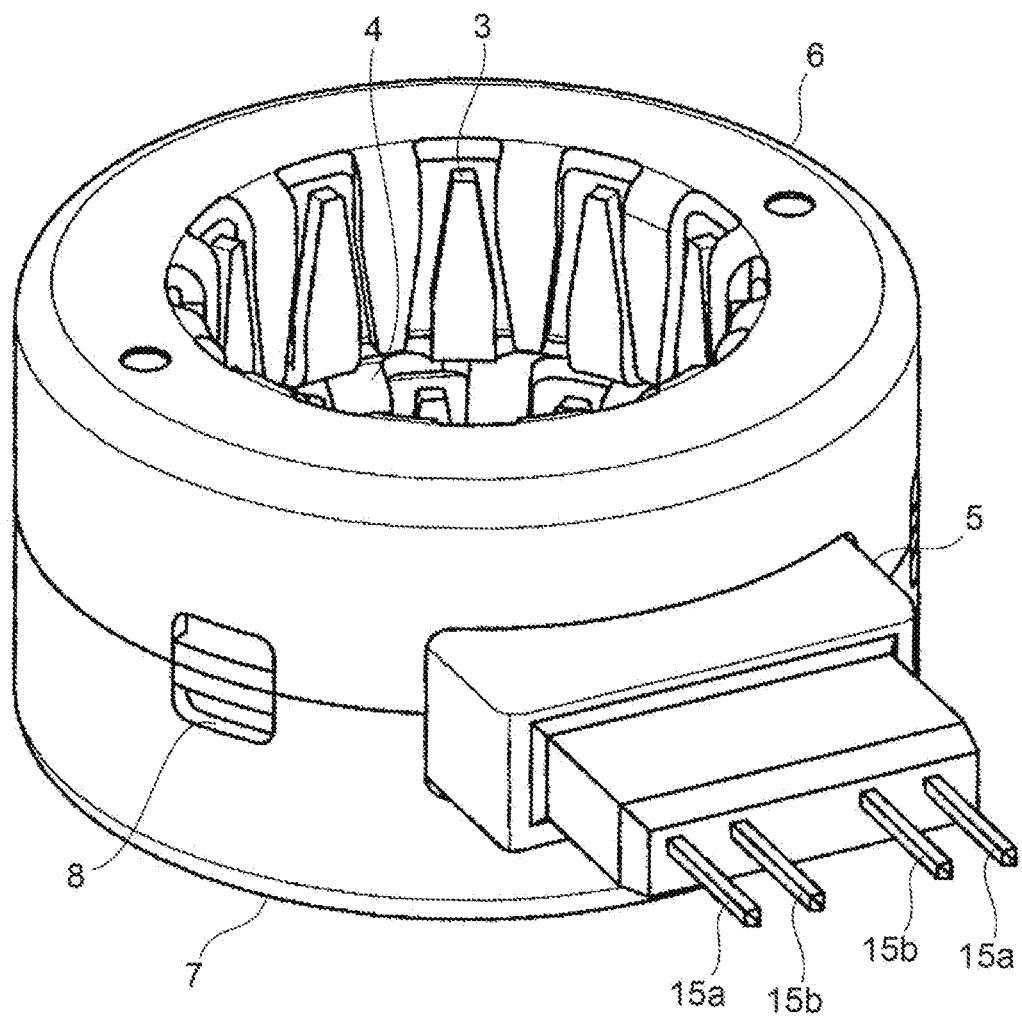
FIG. 7 is a perspective view showing the assembly step (state 3 during assembly) of the stator coil including the coil device shown in FIGS. 1A and 1B.

After that, the outer periphery of the magnet wire 20, the terminal connecting part 11 of the coil bobbin 10, and the outside of the conducting parts 17a and 17b of the conducting terminals 15a and 15b fixed to the terminal connecting part 11 of the coil device 1 as stated above are covered with mold resin (not shown in FIGS. 1A and 1B, etc., and shown in FIGS. 6 and 7).

The coil device 1 having the above structure may be used for a motor-driven valve (e.g., a motor-driven value used for refrigerating cycle or a heat-pump type heating and cooling system) including a stepping motor having a stator coil made up of the coil device 1, a valve body having a valve orifice, and a valve shaft that is driven by a driving force from the energized stepping motor to open and close the valve orifice (see Patent Literature 1 as stated above, for example, for the details).

Figure 5:
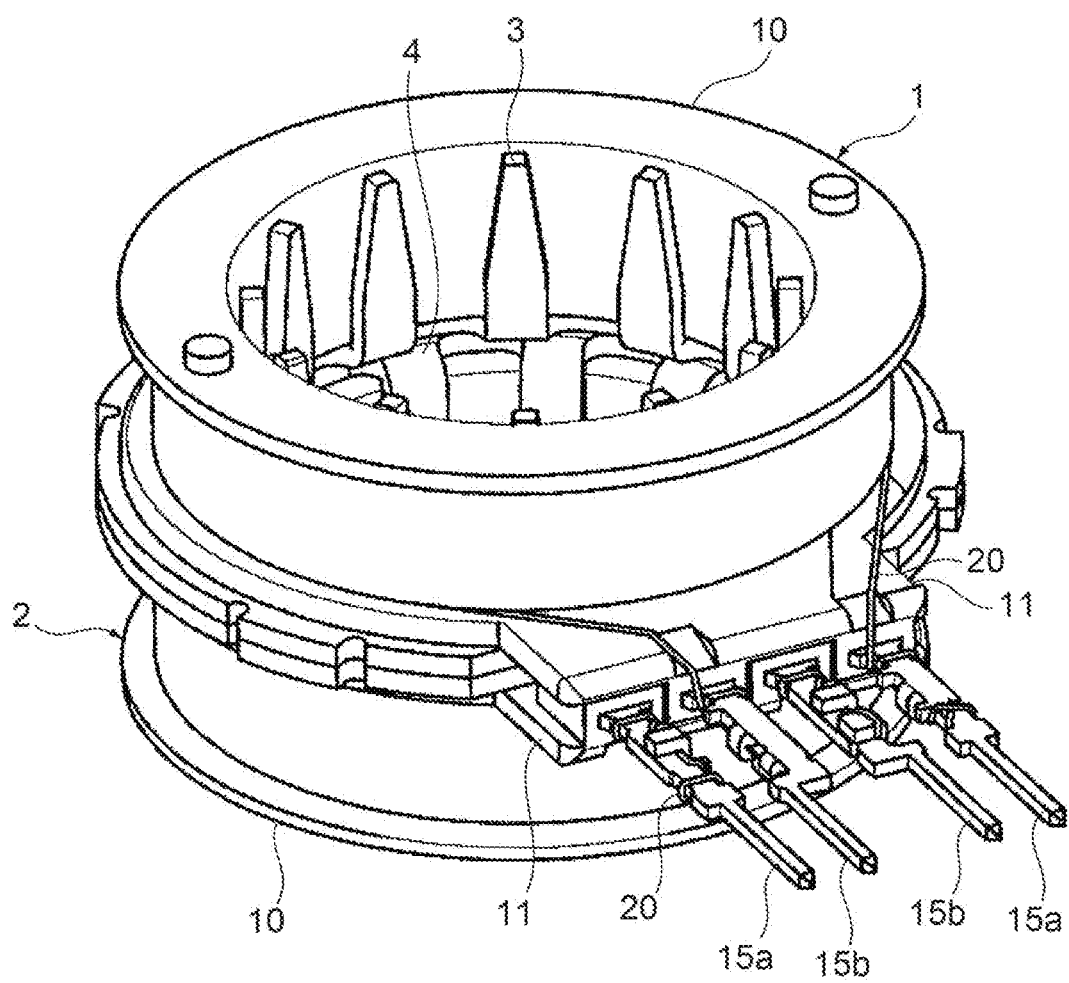
FIG. 5 is a perspective view showing the assembly step (state 1 during assembly) of the stator coil including the coil device shown in FIGS. 1A and 1B.
Figure 8:
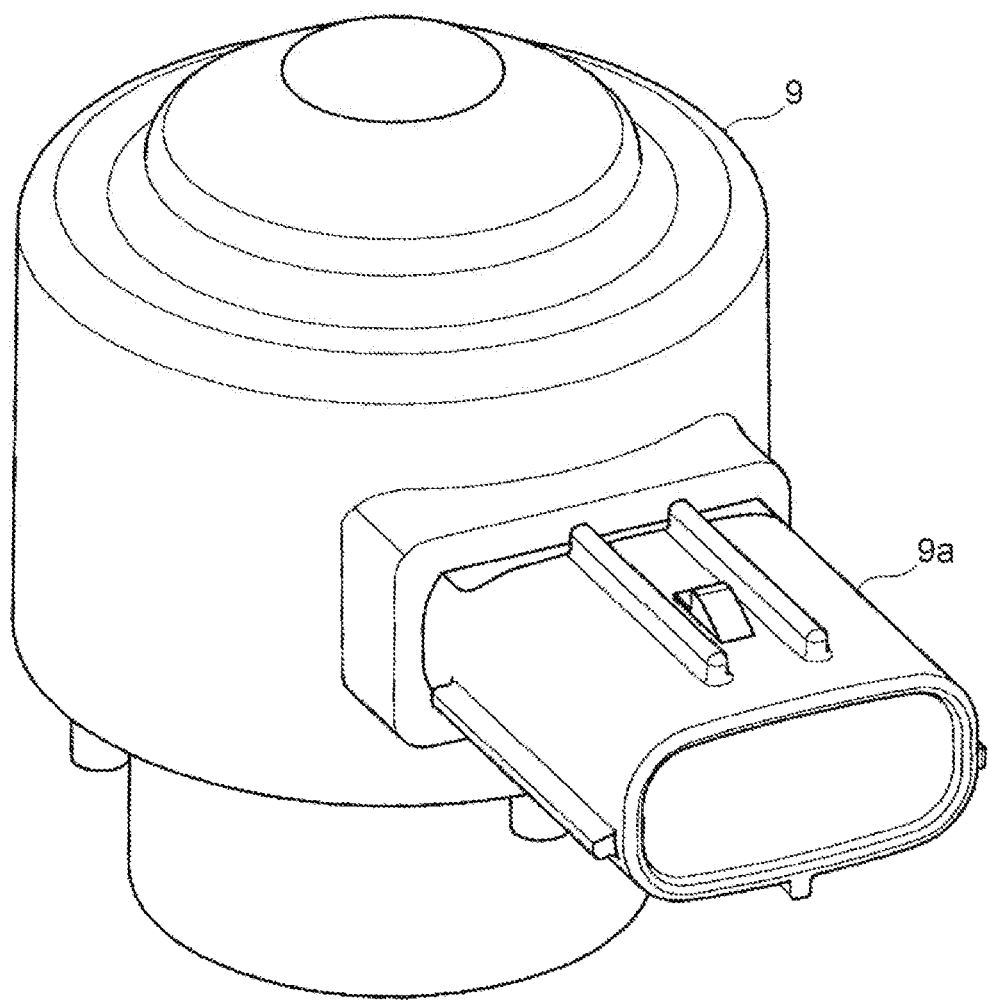
FIG. 8 is a perspective view showing the assembly step (state after the assembly) of the stator coil including the coil device shown in FIGS. 1A and 1B.

The following gives an outline on the method of assembling the stator coil made up of the coil device 1 as one example, with reference to FIG. 5 of FIG. 8. Firstly the method prepares a plurality of coil devices 1 (before molded with resin) each having the above-stated structure (two coil devices in this example). Inner yokes 3 and 4 having a plurality of magnetic-pole teeth protruding on the inner periphery are attached to these two coil device (hereinafter called coil devices 1 and 2), and then the coil devices 1 and 2 are arranged back to back (so that the lower faces of FIG. 1A, 1B are opposed). The (four) conducting terminals 15a and 15b fixed to these coil devices 1 and 2 (to their terminal connecting parts 11) are arranged laterally (on the same plane) as shown in FIG. 5.

Next the method covers the outer periphery of the magnet wire 20, the terminal connecting part 11 of the coil bobbin 10, and the outside of parts close to the bases (the conducting parts 17a and 17b) of the conducting terminals 15a and 15b fixed to the terminal connecting part 11 of each coil device 1, 2 with mold resin 5 while exposing the distal-end parts (the terminal parts 16a and 16b) of the conducting terminals 15a and 15b as shown in FIG. 6. Then the method attaches outer yokes 6 and 7, which have the same number of magnetic-pole teeth as those of the inner yokes 3 and 4 protruding on the inner periphery, from the above and below while arranging the magnetic-pole teeth of the outer yokes 6 and 7 between the magnetic-pole teeth of the inner yokes 3 and 4 as shown in FIG. 7. The attached outer yokes 6 and 7 define an opening 8 to introduce resin to the inside.

Then the method forms an outer shell 9 (the outer shell 9 having a tubular connector 9a integrally formed in this example) by resin molding so as to cover the gap between the magnetic-pole teeth and the outside of the outer yokes 6 and 7 and so that the distal-end parts (terminal parts 16a and 16b) of the conducting terminals 15a and 15b are placed inside of the connector 9a as shown in FIG. 8. In this way the method assembles the stator coil to make up a stepping motor for a motor-driven valve.

Needless to say about the details, the coil device 1 having the above structure may be used for a solenoid valve as well (e.g., a solenoid value used for refrigerating cycle or a fluid system, such as multi-air-conditioning system) including a solenoid coil including the coil device 1, a valve body having a valve orifice, and a valve shaft that is driven by a magnetic force from the energized solenoid coil to open and close the valve orifice.

As stated above for the present embodiment, the terminal end of the magnet wire 20 wound around the coil bobbin 10 is fixed to the conducting terminal (wind-ending side conducting terminal) 15b by swaging and/or fusing at the distal-end binding part (wind-ending side distal-end binding part) 21b to bind the terminal end of the magnet wire 20. This considerably reduces the man-hours and the cost for manufacturing because it firmly fixes the terminal end of the magnet wire 20 to the conducting terminal 15b with the distal-end binding part 21b, and eliminates the job to remove the distal-end binding part 21b.

The distal-end binding part (wind-ending side distal-end binding part) 21b and the fusing part (wind-ending side wire-connecting part) 23b of the conducting terminal 15b face the same face of the conducting terminal 15b (lower face in the present embodiment). This facilitates the job to connect the magnet wire 20 with the conducting terminal 15b and the job to fix the magnet wire 20 to the conducting terminal 15b, and so simplifies the manufacturing process.

The distal-end binding part (wind-ending side distal-end binding part) 21b of the conducting terminal 15b includes the relatively narrow winding part 21ba and the relatively wide contacting part 21bb, and the winding part (corresponding to the deformed part by bending during swaging and fusing of the distal-end binding part 21b) 21ba and the fusing part (wind-ending side wire-connecting part) 23b have a substantially same width. This also simplifies the job to connect the magnet wire 20 with the conducting terminal 15b and the job to fix the magnet wire 20 to the conducting terminal 15b, and so simplifies the manufacturing process.

The above embodiment describes the case of using highly heat-resistant magnet wire for the magnet wire 20 and so fixing and electrically connecting (wire connecting) of the magnet wire 20 to the conducting terminals 15a and 15b by fusing. In other embodiments, other methods of wire-connecting may be used, such as hanging or soldering, depending on the type of the magnet wire, for example.

REFERENCE SIGNS LIST

1 Coil device
10 Coil bobbin
11 Terminal connecting part
12a, 12b Support
13a, 13b Insertion hole
14a, 14b Guide
15a, 15b Conducting terminal
16a, 16b Terminal part
17a, 17b Conducting part
20 Magnet wire
21a, 21b Distal-end binding part (wind-starting side distal-end binding part, wind-ending side distal-end binding part)
21ba Winding part
22bb Contacting part
22a, 22b Proximal-end binding part (wind-starting side proximal-end binding part, wind-ending side proximal-end binding part)
23a, 23b Fusing part (wind-starting side wire connecting part, wind-ending side wire connecting part)
24a, 25a, 25b Positioning projection

The invention claimed is:

1. A coil device comprising: a coil bobbin having a wind-starting side conducting terminal and a wind-ending side conducting terminal; a magnet wire wound around the coil bobbin and having a starting end bound and fixed to the wind-starting side conducting terminal and a terminal end bound and fixed to the wind-ending side conducting terminal; and a mold resin covering an outer periphery of the magnet wire, wherein
the wind-ending side conducting terminal includes, from the proximal end, a wind-ending side proximal-end binding part and a wind-ending side distal-end binding part for binding the magnet wire, and a wind-ending side wire-connecting part between the wind-ending side proximal-end binding part and the wind-ending side distal-end binding part for connecting the magnet wire with the wind-ending side conducting terminal, the terminal end of the magnet wire is fixed to the wind-ending side conducting terminal by swaging and/or fusing at the wind-ending side distal-end binding part; and the wind-ending side distal-end binding part has: a winding part that protrudes from the wind-ending side conducting terminal and being for binding the magnet wire; and a contacting part that protrudes from the winding part and being brought into contact with the wind-ending side conducting terminal.

2. The coil device according to claim 1, wherein a width of the winding part in a longitudinal direction of the wind-ending side conducting terminal is narrower than a width of the contacting part in the longitudinal direction of the wind-ending side conducting terminal.

3. The coil device according to claim 1, wherein the winding part of the wind-ending side distal-end binding part and the wind-ending side wire-connecting part have a same width.

4. The coil device according to claim 1, wherein the wind-ending side conducting terminal has a rectangular shape in cross section, and the wind-ending side distal-end binding part and the wind-ending side wire-connecting part face a same face of the wind-ending side conducting terminal.

5. The coil device according to claim 1, wherein the wind-starting side conducting terminal includes, from the distal end, a wind-starting side distal-end binding part and a wind-starting side proximal-end binding part for binding the magnet wire, and a wind-starting side wire-connecting part between the wind-starting side distal-end binding part and the wind-starting side proximal-end binding part for connecting the magnet wire with the wind-starting side conducting terminal.

* * * * *